United States Patent
Miyauchi et al.

(10) Patent No.: US 10,857,650 B2
(45) Date of Patent: Dec. 8, 2020

(54) INNER SURFACE FINISHING TOOL

(71) Applicant: SUGINO MACHINE LIMITED, Uozu (JP)

(72) Inventors: Shinya Miyauchi, Uozu (JP); Mitsuru Muto, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 200 days.

(21) Appl. No.: 16/057,196

(22) Filed: Aug. 7, 2018

(65) Prior Publication Data
US 2019/0061099 A1  Feb. 28, 2019

(30) Foreign Application Priority Data

Aug. 23, 2017  (JP) ................................. 2017-160077

(51) Int. Cl.
*B24B 39/02* (2006.01)

(52) U.S. Cl.
CPC .......... *B24B 39/023* (2013.01); *B24B 39/026* (2013.01)

(58) Field of Classification Search
CPC ........ B21D 39/08; B21D 39/10; B21D 39/12; B21D 39/14; B21D 39/16; B21D 39/18; B21D 39/20; B21D 39/203; B21D 39/206; B21D 41/026; B21D 17/04; Y10T 29/47; Y10T 29/476; Y10T 29/477; B23B 2270/26; B24B 39/00; B24B 39/003; B24B 39/02; B24B 39/023
See application file for complete search history.

(56) References Cited

U.S. PATENT DOCUMENTS

| | | | |
|---|---|---|---|
| 3,517,533 A | 6/1970 | Koznar | |
| 5,972,132 A * | 10/1999 | Cadle | B22F 3/24 148/514 |
| 8,931,320 B2 * | 1/2015 | Miyauchi | B24B 39/023 29/90.01 |
| 9,033,770 B2 * | 5/2015 | Miyauchi | B23B 29/03417 451/461 |
| 2012/0160005 A1 | 6/2012 | Miyauchi et al. | |

FOREIGN PATENT DOCUMENTS

JP          62-025151 U     2/1987

OTHER PUBLICATIONS

Extended European Search Report dated Jan. 23, 2019 in corresponding European patent application No. 18187350.6, 7 pp.

* cited by examiner

*Primary Examiner* — Matthew Katcoff
(74) *Attorney, Agent, or Firm* — United IP Counselors, LLC

(57) ABSTRACT

An inner surface finishing tool enables machining of a workpiece made of a material machinable with a relatively large burnishing amount while reducing deformation at the opening of the workpiece or deterioration of its geometrical tolerance during machining of the inner peripheral surface. The tool includes a mandrel rotatable relative to the workpiece and includes a polygonal member, and a frame that is cylindrical and fitted onto the mandrel in a rotatable manner and has an axis extending in an axial direction of the mandrel and holds a plurality of first rollers and a plurality of second rollers rollable on an outer peripheral surface of the mandrel. The polygonal member rotates the plurality of second rollers to move inward and outward in a radial direction of the frame.

4 Claims, 4 Drawing Sheets

INNER SURFACE FINISHING TOOL

CROSS-REFERENCE TO RELATED APPLICATIONS

This application claims the benefit of priority to Japanese Patent Application No. 2017-160077, filed on Aug. 23, 2017, the entire contents of which are hereby incorporated by reference.

BACKGROUND

1. Technical Field

The present invention relates to an inner surface finishing tool for finishing the inner peripheral surface of a workpiece.

2. Description of the Background

The automotive industry, the electronic equipment industry, and the semiconductor industry all use components with higher accuracy. Components with mirror-finished surfaces after finishing may have an increasing demand for their surface roughness to fall under close dimensional or geometrical tolerances.

Such components with close geometrical tolerances including circularity or cylindricity undergo finishing using an inner surface finishing tool to achieve intended accuracy. A known inner surface finishing tool may be a roller burnishing tool for machining the inner peripheral surface of a workpiece to have an intended surface roughness and an increased surface hardness by rotating its rollers while pressing them against the surface (refer to, for example, Japanese Unexamined Utility Model Application Publication No. S62-25151, hereafter Patent Literature 1).

Patent Literature 1 describes a roller peening tool for peening while burnishing at the same time, by rotating a polygonal shaft and thus vibrating rollers.

BRIEF SUMMARY

A known roller burnishing tool may apply a large stress (burnishing amount) to a metal surface to cause plastic deformation. The burnishing amount herein refers to a difference between the tool diameter and the pre-machined inner diameter of the workpiece. Machining of the inner peripheral surface of a workpiece using this tool may cause deformation such as edge wear at the opening of the workpiece, or deterioration of its geometrical tolerances including circularity and cylindricity.

A known roller peening tool is used for finishing the inner peripheral surface of a workpiece by causing rollers to strike the workpiece intermittently. A large burnishing amount may prevent a frame (retainer) holding the rollers from rotating and obstruct the sun-and-planet motion for uniformly machining the entire inner peripheral surface of the workpiece. A known roller peening tool thus has uses limited to workpieces of materials with a low elastic modulus, such as aluminum, with a relatively small burnishing amount.

One or more aspects of the present invention are directed to an inner surface finishing tool for machining a workpiece made of a material machinable with a relatively large burnishing amount while reducing deformation at the opening of the workpiece or deterioration of its geometrical tolerance during machining of the inner peripheral surface.

One aspect of the present invention provides an inner surface finishing tool for finishing an inner peripheral surface of a workpiece, the tool including:
a mandrel rotatable relative to the workpiece, the mandrel including a polygonal member; and
a frame that is cylindrical and fitted onto the mandrel in a rotatable manner, the frame having an axis extending in an axial direction of the mandrel, the frame holding a plurality of first rollers and a plurality of second rollers rollable on an outer peripheral surface of the mandrel,
wherein the polygonal member is configured to rotate the plurality of second rollers to move inward and outward in a radial direction of the frame.

The inner surface finishing tool according to the above aspect of the present invention enables machining of a workpiece made of a material machinable with a relatively large burnishing amount while reducing deformation at the opening of the workpiece deterioration of its geometrical tolerances during machining of the inner peripheral surface.

DETAILED DESCRIPTION

Figure 1:
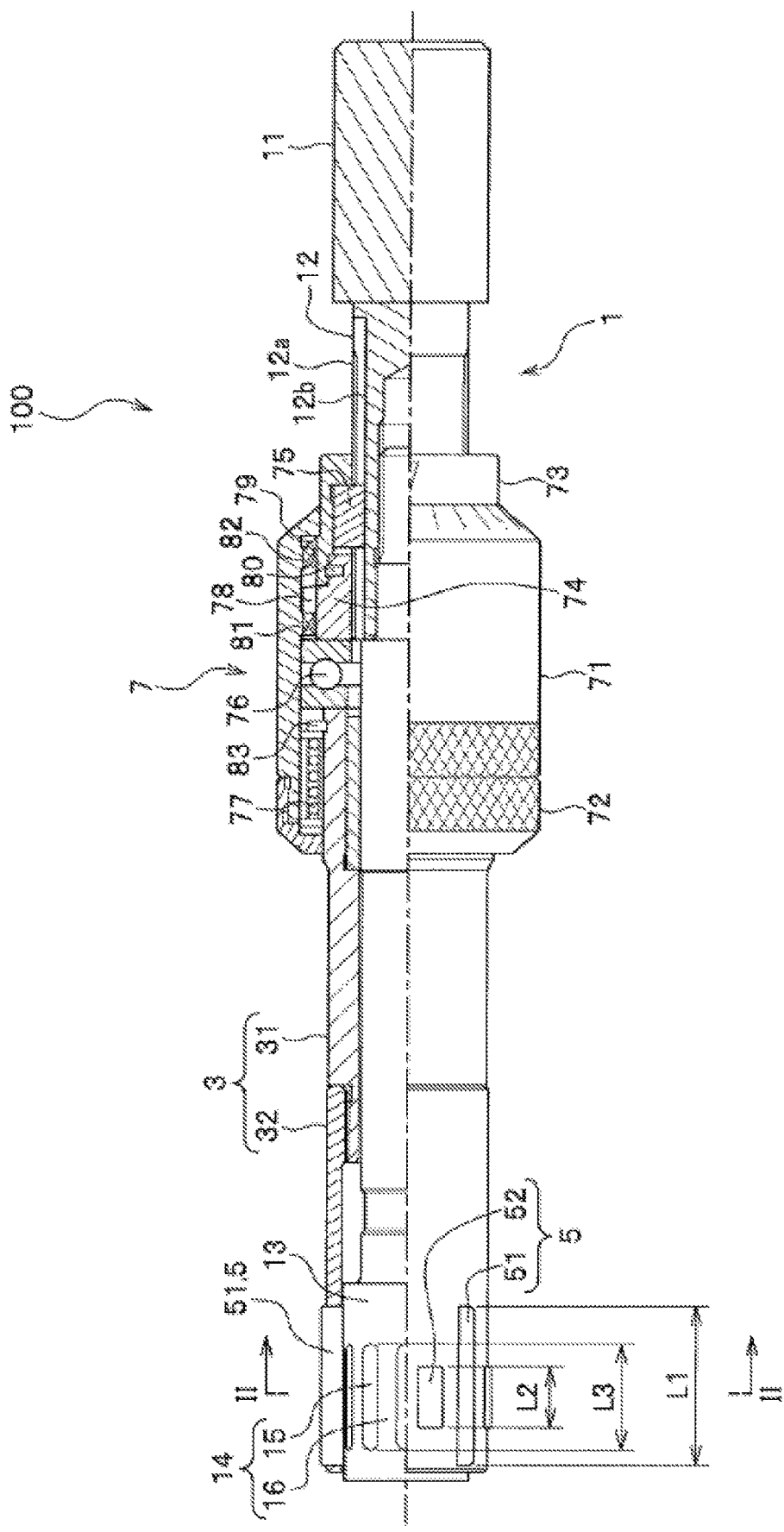
FIG. 1 is a side view of an inner surface finishing tool according to one embodiment showing its overall structure, having its upper half shown in cross section.

An embodiment will now be described in detail with reference to the drawings.

In each drawing, common or identical components are given the same reference numerals and will not be described repeatedly.

Figure 2:
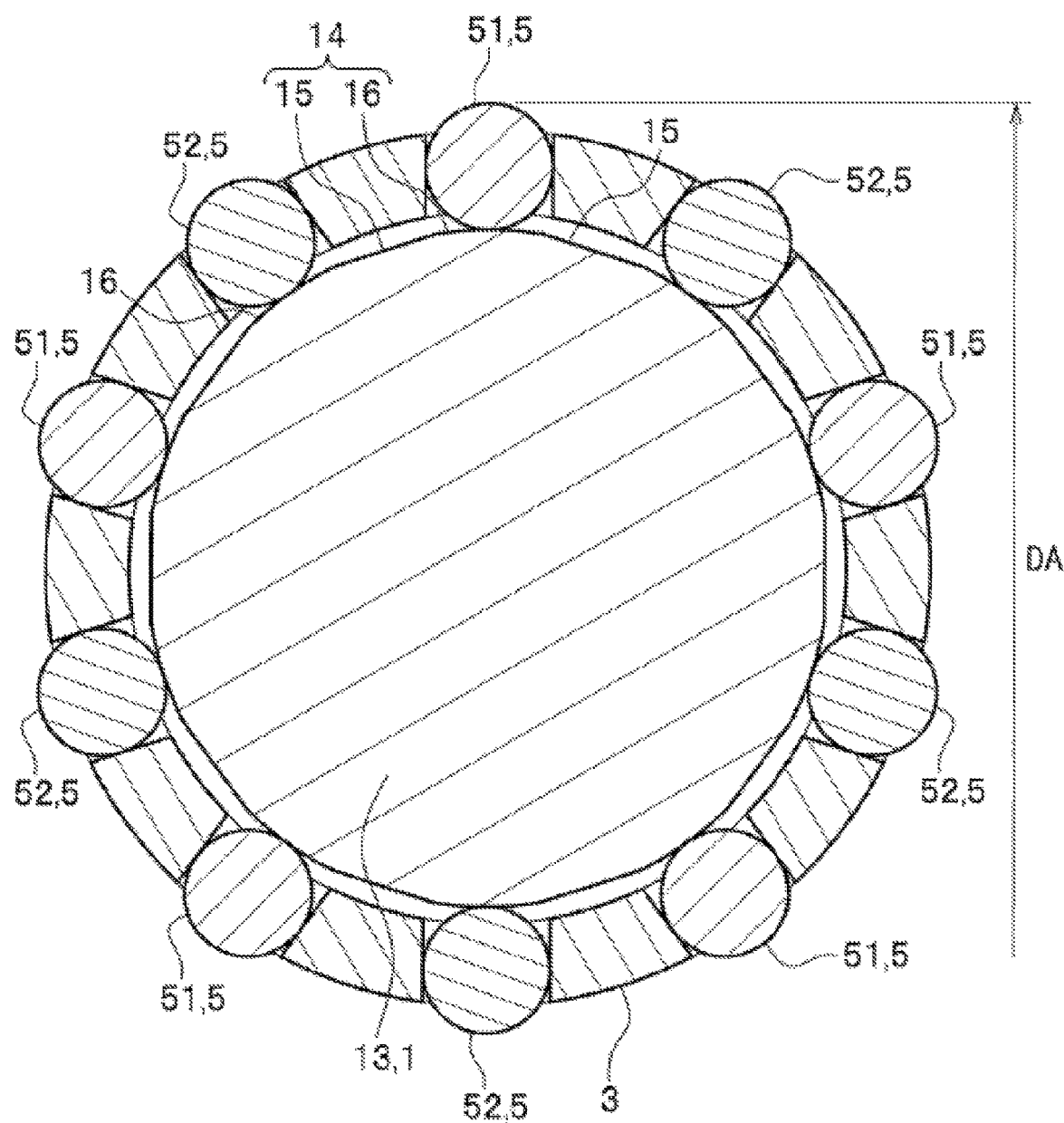
FIG. 2 is a cross-sectional view taken along line II-II in FIG. 1.
Figure 3A:
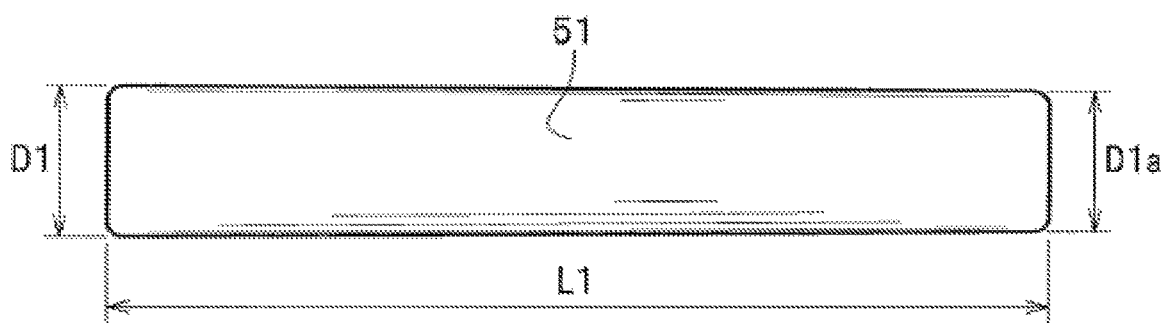
FIG. 3A is a side view of a first roller shown in FIG. 1.
Figure 3B:
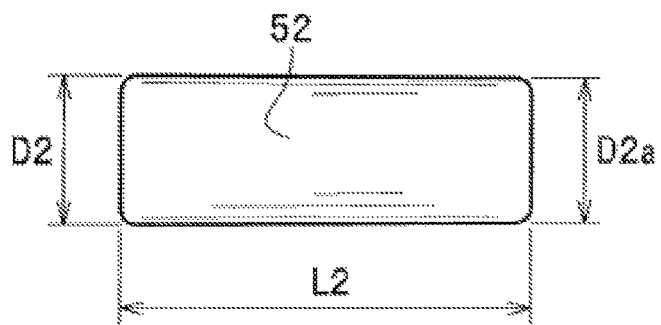
FIG. 3B is a side view of a second roller shown in FIG. 1.

FIG. 1 is a side view of an inner surface finishing tool 100 according to one embodiment showing its overall structure. FIG. 1 shows the upper half of the tool in cross section. FIG. 2 is a cross-sectional view taken along line II-II in FIG. 1. FIG. 3A is a side view of a first roller 51 shown in FIG. 1. FIG. 3B is a side view of a second roller 52 shown in FIG. 1. For ease of explanation, the right in FIG. 1 (toward a shank 11) is referred to as the rear, and the left in FIG. 1 is referred to as the front or forward.

As shown in FIG. 1, the inner surface finishing tool 100 according to the present embodiment includes a mandrel 1 and a cylindrical frame 3. The mandrel 1 is attached to a machining center (not shown) as a finishing machine, and is rotated. The frame 3 is fitted onto the mandrel 1 in a rotatable manner. The frame 3 is inserted into a workpiece W toward its inner peripheral surface Wa (refer to FIG. 4), and the mandrel 1 is rotated for finishing the inner peripheral surface Wa.

The frame 3 is cylindrical, and includes a rear first frame 31 and a front second frame 32. The first frame 31 and the second frame 32 are joined together with screws in a separable manner. The frame 3 holds multiple rollers 5 that roll on the outer peripheral surface of the mandrel 1 when driven by the rotating mandrel 1. The multiple rollers 5 include multiple first rollers 51 and multiple second rollers 52. The first rollers 51 and the second rollers 52 are collectively referred to as the rollers 5.

The mandrel 1 is a round rod as a whole. The mandrel 1 includes the shank 11 at the rear in the axial direction, which is attachable to a finishing machine (not shown) such as a machining center. The mandrel 1 includes a body 13 at the front, and an intermediate portion 12 in its substantially middle.

The body 13 is tapered to have a diameter gradually decreasing toward the front of the mandrel 1 (to the left in FIG. 1). The body 13 includes a polygonal member 14 in its substantially middle.

The polygonal member 14 includes flat portions 15 and curved portions 16. The flat portions 15 are flat surfaces slightly inward from the outer peripheral surface of the body 13. The multiple flat portions 15 are circumferentially arranged at small intervals around the mandrel 1. The curved portions 16 are on (or having the same diameter as) the outer peripheral surface of the body 13 and extend slightly outward from the flat portions 15. Each curved portion 16 is arranged between two adjacent flat portions 15.

As shown in FIG. 2, the polygonal member 14 has a substantially polygonal cross section (a substantially regular decagon in FIG. 2) including the curved portions 16 as vertexes and the flat portions 15 as sides. In other words, the polygonal member 14 is substantially polygonal as viewed in a cross section perpendicular to the axial direction. The tool has surfaces having a smooth curvature between the flat portions 15 and the curved portions 16 to allow the second rollers 52 to roll smoothly.

As shown in FIG. 1, the frame 3 is fitted onto the mandrel 1 to have the first rollers 51 arranged on the body 13 across the polygonal member 14 (described in detail later). This allows the first rollers 51 to come in contact with the outer peripheral surface of the body 13 without touching the flat portions 15. The second rollers 52 come in contact with only the polygonal member 14. The shank 11 may be selectable from various shapes attachable to a finishing machine, other than being straight as in the present embodiment. For example, the shank 11 may be tapered.

The first rollers 51 and the second rollers 52 are arranged alternately at intervals on the same circumference as the frame 3. The rollers 5 (the first rollers 51 and the second rollers 52) are mounted on the frame 3 with their axes extending in the axial direction of the frame 3 and the mandrel 1.

As shown in FIGS. 3A and 3B, the first rollers 51 have a length L1 greater than a length L2 of the second rollers 52. The second rollers 52 have a diameter D2 smaller than a diameter D1 of the first rollers 51.

The first rollers 51 and the second rollers 52 have their diameters gradually decreasing toward the rear end of the mandrel 1 (to the right in FIGS. 3A and 3B), or in other words, tapered in the direction opposite to the body 13. More specifically, the first rollers 51 and the second rollers 52 have the front end diameters D1 and D2 slightly larger than their rear end diameters D1a and D2a. The rollers 5 herein have a taper ratio that is ½ of the taper ratio of the body 13.

As shown in FIG. 1, the polygonal member 14 has a length L3 in the axial direction greater than the length L2 of the second rollers 52 and smaller than the length L1 of the first rollers 51.

Figure 4:
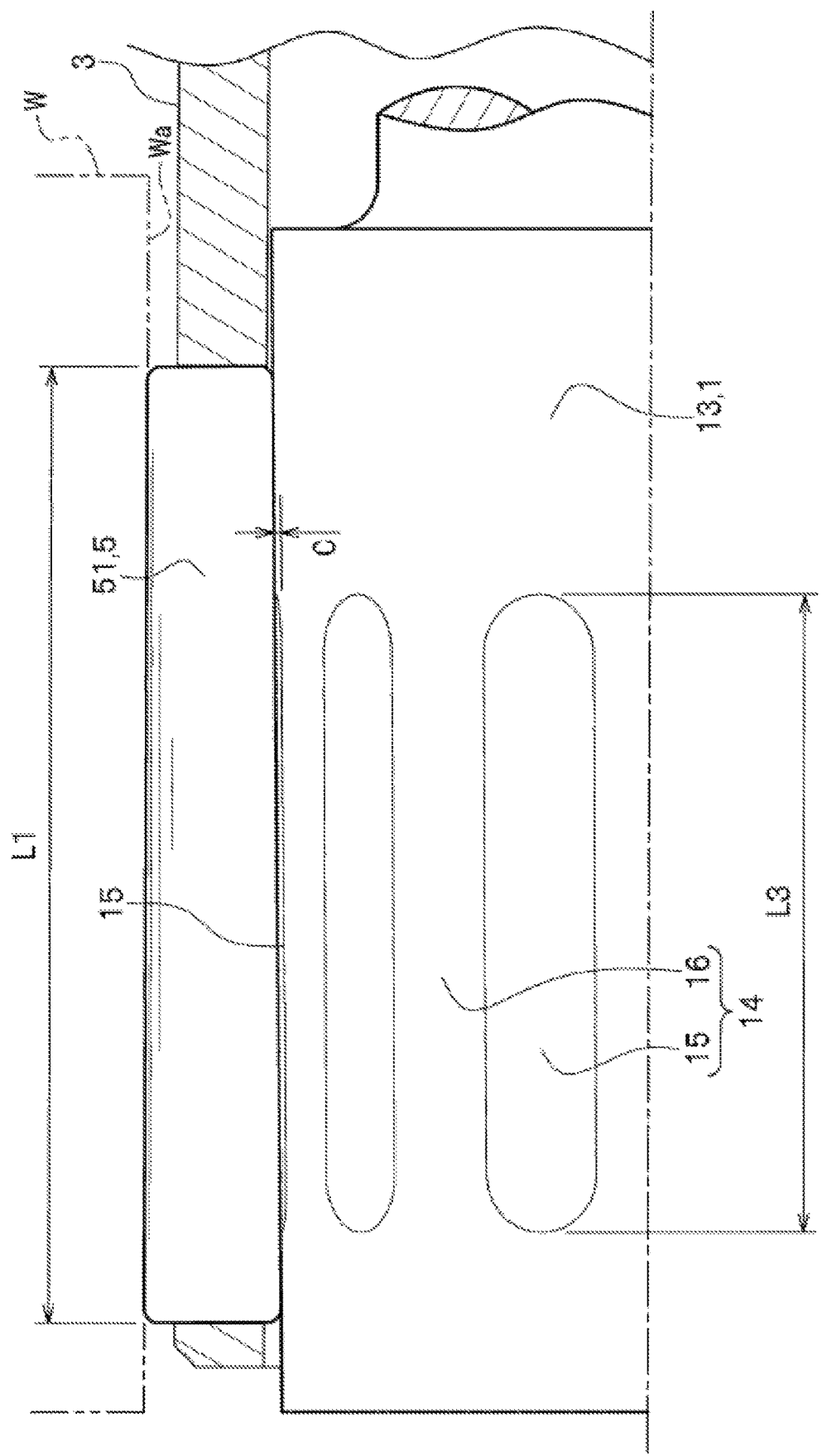
FIG. 4 is a cross-sectional view of the tool in the axial direction showing the first rollers arranged circumferentially and facing a flat portion of a polygonal member.

FIG. 4 is a cross-sectional view of the tool in the axial direction showing the first rollers 51 arranged circumferentially and facing the flat portions 15.

As shown in FIG. 4, the first rollers 51 have their two axial ends located beyond the two axial ends of the polygonal member 14. Thus, the first rollers 51 have their two ends in contact with the outer peripheral surface of the body 13, thus leaving a slight clearance C between the substantially middle portions of the first rollers 51 and the flat portions 15. More specifically, the first rollers 51 have their two ends supported by the outer peripheral surface of the body 13, and the substantially middle portions of the first rollers 51 having no contact with the surfaces of the flat portions 15.

As shown in FIG. 1, the polygonal member 14 has their two axial ends located beyond the two axial ends of the second rollers 52. This allows the second rollers 52 to come in contact with the flat portions 15. The second rollers 52 are thus located radially inward when in contact with the flat portions 15 and radially outward when in contact with the curved portions 16. More specifically, the polygonal member 14 rotates the multiple second rollers 52, among the multiple rollers 5, to move inward and outward in the radial direction of the frame 3.

The inner surface finishing tool 100 includes a tool diameter adjuster 7, which adjusts a tool diameter DA (refer to FIG. 2) by axially moving the frame 3. The tool diameter DA is the diameter of an envelope circle connecting the outer peripheral surfaces of the multiple rollers 5.

The length L1 of the first rollers 51 always extends across the flat portions 15 when the frame 3 is axially moved relative to the mandrel 1 using the tool diameter adjuster 7. In other words, operating the tool diameter adjuster 7 causes no contact between the first rollers 51 and the surfaces of the flat portions 15.

As shown in FIG. 4, the inner surface finishing tool 100 is inserted into the workpiece W toward the inner peripheral surface Wa while the rollers 5 (the first rollers 51 and the second rollers 52) are located between the body 13 and the inner peripheral surface Wa.

The mandrel 1, the rollers 5, and the frame 3 are formed from special alloy steel to achieve intended durability and undergo thermal treatment to increase hardness and toughness. The durability may further be increased using surface coatings of, for example, diamond-like carbon (DLC), titanium nitride (TIN), or titanium carbonitride (TICN) in accordance with the working conditions.

The tool diameter adjuster 7 includes a housing 71, a front cap 72, and an adjustment ring 73. The tool diameter adjuster 7 further includes, for example, an adjustment nut 74, a key 75, a bearing 76, and a spring 77 inside the area defined by the housing 71, the front cap 72, and the adjustment ring 73. The adjustment nut 74 is screwed with a thread 12a on the intermediate portion 12. The adjustment nut 74 includes external teeth 78 on its outer periphery, and an abutment surface, which comes in contact with the bearing 76, on its front end. The adjustment ring 73 is supported by the adjustment nut 74 with a snap ring 80 in a relatively rotatable and unremovable manner, and is radially outwardly fitted to the intermediate portion 12 loosely with a predetermined clearance. The adjustment ring 73 includes external teeth 79 on its outer periphery, which are similar to the external teeth 78 on the adjustment nut 74. Relative movement of the adjustment ring 73 in the circumferential direction of the mandrel 1 is regulated by the key 75, which is fitted in a keyway 12b on the intermediate portion 12.

The housing 71 is cylindrical, and has internal teeth 81 and 82, which respectively mesh with the external teeth 78 and 79. The front cap 72 is arranged at the front of the housing 71. The spring 77 is placed between a stop ring 83, which is attached near the rear end of the frame 3, and the inner side of the front cap 72.

To adjust the tool diameter DA using the tool diameter adjuster 7, the housing 71 is held and moved rearward against the urging force of the spring 77. This causes the internal teeth 81 and 82 meshing with the external teeth 78 and 79 to move together. When moving further, the internal teeth 82 are disengaged from the external teeth 79. In this state, the external teeth 78 remain meshing with the internal teeth 81.

The housing 71 is then rotated while pressed rearward. In this state, the internal teeth 81 mesh with the external teeth 78, whereas the internal teeth 82 are disengaged from the external teeth 79 and freely rotatable. As the housing 71 is rotated, the adjustment nut 74 rotates integrally with the housing 71, moving the adjustment nut 74 forward or rearward along the thread 12a as guided by its lead. As the adjustment nut 74 moves forward or rearward while rotating, the key 75 moves the adjustment ring 73 along the mandrel 1.

The adjustment nut 74 moving forward or rearward causes contact between the body 13 and the rollers 5 at positions shifted in the axial direction of the mandrel 1. This allows the tool diameter DA to change to a desired value in accordance with the diameter of the body 13 at the shifted position of contact between the body 13 and the rollers 5.

When the tool diameter DA reaches the desired value, the housing 71 is released to stop adjusting the tool diameter DA. The spring 77, which has been compressed, stretches and presses the front cap 72 forward. This causes the housing 71 to move forward together until coming in contact with the adjustment ring 73 and stops. In this state, the internal teeth 81 and 82 respectively mesh with the external teeth 78 and 79, and the adjustment ring 73 is locked by the key 75 and the keyway 12b and is not rotatable. The housing 71 is not rotatable relative to the mandrel 1.

The machining procedure for finishing the inner peripheral surface Wa of the workpiece W with the inner surface finishing tool 100 will now be described. The machining procedure includes an adjustment process, a machining process, and a tool withdrawal/removal process.

In the adjustment process, the tool diameter DA for the rollers 5 is adjusted. More specifically, the housing 71 is held and moved toward the driving end of the mandrel 1, or specifically the shank 11. The housing 71 is then rotated. The housing 71 is rotated until the tool diameter DA reaches a desired diameter, and then is released. The spring 77 then urges the housing 71 to the initial position, automatically locking the rotation of the housing 71. This completes the setting to the desired tool diameter DA. The tool diameter DA is measured with a gauge (not shown) to determine whether the tool diameter DA has been set correctly.

In the machining process, the shank 11 is attached to a finishing machine. The inner surface finishing tool 100 is moved to an area to be finished on the inner peripheral surface Wa. The finishing machine is driven to rotate the mandrel 1. The mandrel 1 may rotate clockwise as viewed from the front, causing the rollers 5 to rotate (spin) counterclockwise along the outer peripheral surface of the mandrel 1. The rollers 5 on the fixed workpiece W rotate clockwise while spinning counterclockwise along the inner peripheral surface Wa and the outer peripheral surface of the body 13.

The first rollers 51 are arranged across the flat portions 15 and come in contact with the outer peripheral surface of the body 13. The first rollers 51 have no contact with the flat portions 15, irrespective of the rotational direction position of the mandrel 1. Thus, the first rollers 51 do not move relative to the radial direction of the frame 3 while spinning as the mandrel 1 rotates. The first rollers 51 enable the operator to burnish the inner peripheral surface Wa in a stable manner. The first rollers 51 are in constant contact with the inner peripheral surface Wa and allow the sun-and-planet motion of the frame 3. The burnishing amount may be minimized to provide a minimum load that allows the sun-and-planet motion.

The second rollers 52 operate differently from the first rollers 51 when the mandrel 1 rotates. In the same manner as the first rollers 51, the second rollers 52 rotate clockwise while spinning counterclockwise along the outer peripheral surface of the body 13. The second rollers 52 travel while passing along the flat portions 15 and the curved portions 16 alternately. The flat portions 15 and the curved portions 16 have different heights (the clearance C in FIG. 4) to cause the second rollers 52 to vibrate in the radial direction of the frame 3 while rolling on the inner peripheral surface Wa. The second rollers 52 move radially inward and outward to strike the inner peripheral surface Wa. In other words, the polygonal member 14 causes the second rollers 52 to strike the inner peripheral surface Wa intermittently. The impact when the second rollers 52 strike the surface is used for peening or smoothing the unevenness of the inner peripheral surface Wa.

In the tool withdrawal/removal process, the inner surface finishing tool 100 is moved axially until separating from the inner peripheral surface Wa. The inner surface finishing tool 100 receives the frictional force (resistance) on the inner peripheral surface Wa to compress the spring 77. This causes the frame 3 to move forward relative to the mandrel 1. Thus, the tool diameter DA decreases automatically. This disables the inner surface finishing tool 100 from machining when withdrawn to the initial position. The inner surface finishing tool 100 is then removed from the finishing machine to complete the machining procedure for finishing the inner peripheral surface Wa.

In the present embodiment, the multiple rollers 5, which are held by the frame 3, include the multiple first rollers 51 and the multiple second rollers 52. The mandrel 1 includes the polygonal member 14 that rotates the multiple second rollers 52 to move inward and outward in the radial direction of the frame 3.

Thus, the first rollers 51 perform burnishing while serving as a guide for allowing the sun-and-planet motion of the frame 3, whereas the second rollers 52 perform peening by intermittently striking the inner peripheral surface Wa. This allows regular sun-and-planet motion of the frame 3 for uniformly machining the inner peripheral surface Wa and smoothing the unevenness of the inner peripheral surface Wa by peening. The first rollers 51 and the second rollers 52 have their side surfaces in contact with the inner peripheral surface Wa to provide improved finished surfaces in a wide area. Moreover, peening improves the hardness of the target surface and applies compressive residual stress to improve the strength of the workpiece W.

Peening improves the surface roughness of the inner peripheral surface Wa, thus enabling machining of the workpiece W without increasing the burnishing amount. The burnishing amount can be minimized to allow for the sun-and-planet motion of the frame 3. The tool thus reduces deformation such as edge wear at the opening of a workpiece, or deterioration of its geometrical tolerances including circularity and cylindricity during machining of the inner peripheral surface Wa, enabling finishing with high accuracy.

The rollers 5 for finishing the workpiece W serve as a guide for enabling the sun-and-planet motion of the frame 3 using the first roller 51 and as a peening unit for smoothing the unevenness using the second rollers 52. Although a known technique cannot use a large burnishing amount that can obstruct the sun-and-planet motion and thus has its uses limited to a workpiece W made of aluminum, the tool according to the present embodiment is usable for a wide range of workpieces W made of, for example, iron materials.

The workpiece W may be, for example, an engine component including a cylinder bore, a piston, a connecting rod, and a rocker arm, or a brake component including a master cylinder, a steering system, a transmission, and a suspension. As described above, the inner surface finishing tool 100 according to the present embodiment has a wide range of applications for machining components having sliding surfaces with an intended surface roughness and strength.

The inner surface finishing tool 100 for machining a workpiece W made of a material machinable with a relatively large burnishing amount prevents deformation at the opening of a workpiece or deterioration of its geometrical tolerances during machining of the inner peripheral surface Wa.

Although the quality of the finished workpiece W is typically adjustable by increasing and decreasing the burnishing amount, the quality of the finished product is adjusted by the inner surface finishing tool 100 according to the present embodiment by increasing and decreasing the rotational velocity of the mandrel 1 during machining. Increasing or decreasing the rotational velocity of the mandrel 1 adjusts the impact with which the second rollers 52 strike the inner peripheral surface Wa to adjust surface roughness. This eliminates the adjustment of the tool diameter DA and improves the efficiency of the finishing processes.

In the present embodiment, the first rollers 51 have the length L1 greater than the second rollers 52, which have the length L2. The first rollers 51 and the second rollers 52 are alternately arranged at intervals on the same circumference of the frame 3. The polygonal member 14 has the axial length L3 greater than the length L2 of the second rollers 52 and smaller than the length L1 of the first rollers 51. The polygonal member 14 has its two axial ends located beyond the two axial ends of the second rollers 52. The first rollers 51 have their two axial ends located beyond the two axial ends of the polygonal member 14. In this structure, the first rollers 51 and the second rollers 52 are arranged on the same circumference, with the first rollers 51 in contact with the outer peripheral surface of the body 13 across the flat portions 15 and the second rollers 52 in contact with the flat portions 15. The inner surface finishing tool 100 can be compact and lightweight.

In the present embodiment, the second rollers 52 have the diameter D2 smaller than the diameter D1 of the first rollers 51. The first rollers 51 as a guide and the second rollers 52 as a peening unit achieve their functions in a more mutually distinctive and reliable manner, providing stable finishing.

In the present embodiment, the outer peripheral surface of the mandrel 1, which comes in contact with the rollers 5, is tapered to have a diameter gradually decreasing toward the front end of the mandrel 1. The rollers 5 is also tapered to have their diameters gradually decreasing toward the rear end of the mandrel 1. The inner surface finishing tool 100 includes the tool diameter adjuster 7 for adjusting the tool diameter DA by moving the frame 3 in the axial direction. This structure allows adjustment of the dimensions or the surface roughness of the finished inner peripheral surface Wa.

Although the embodiments of the present invention are described above, the present invention is not limited to the structures described in the embodiment. The present invention may be modified variously without departing from the scope and spirit of the invention, including combining or selecting the components described in the above embodiments as appropriate. Further, the components in the above embodiments may be added, eliminated, or substituted.

For example, although the first rollers 51 and the second rollers 52 are arranged on the same circumference of the frame 3 in the above embodiment, they may be displaced in the axial direction. For example, the first rollers 51 may be arranged frontward at the frame 3 on the same circumference, whereas the second rollers 52 may be arranged rearward at the frame 3 on the same circumference. In this case, the length L1 of the first rollers 51 and the length L2 of the second rollers 52 may be the same or may be different. The first rollers 51 and the second rollers 52 may be or may not be at the same circumferential positions on the frame 3.

Although the polygonal member 14 is substantially regular decagonal as viewed in cross section perpendicularly to its axis in the above embodiment, the polygonal member 14 may be in the shape of any other substantially regular polygon, such as a substantially regular octagon.

Although the body 13 and the rollers 5 are tapered in the above embodiment, they may be straight (columnar). In this case, the tool diameter adjuster 7 may be eliminated.

Although the finishing machine to which the inner surface finishing tool 100 is attached is the machining center in the above embodiment, the finishing machine may be another finishing machine, such as a lathe. When the finishing machine is a lathe, a workpiece is rotated while the mandrel is fixed. As a result, the mandrel rotates relative to the workpiece.

REFERENCE SIGNS LIST

1 mandrel
13 body
14 polygonal member
15 flat portion
16 curved portion
3 frame
5 roller
51 first roller
52 second roller
7 tool diameter adjuster
100 inner surface finishing tool
W workpiece
Wa inner peripheral surface
D1 first roller diameter
D2 second roller diameter
DA tool diameter

What is claimed is:

1. An inner surface finishing tool for finishing an inner peripheral surface of a workpiece, the tool comprising:
   a mandrel rotatable relative to the workpiece, the mandrel including a polygonal member; and
   a frame that is cylindrical and fitted onto the mandrel in a rotatable manner, the frame having an axis extending in an axial direction of the mandrel, the frame holding a plurality of first rollers and a plurality of second rollers rollable on an outer peripheral surface of the mandrel,
   wherein the polygonal member is configured to rotate the plurality of second rollers to move inward and outward in a radial direction of the frame, the first rollers have a greater length than the second rollers, the first rollers and the second rollers are arranged alternately at intervals on the same circumference of the frame, the polygonal member has, in the axial direction, a greater length than the second rollers and a smaller length than the first rollers, the polygonal member has, in the axial direction, two ends located beyond two ends of each second roller, and the first rollers each have, in the axial direction, two ends located beyond the two ends of the polygonal member, the mandrel has an outer peripheral surface tapered to have a diameter gradually decreasing toward a front end of the mandrel, the first rollers and the second rollers are tapered to have a diameter gradually decreasing toward a rear end of the mandrel, and the inner surface finishing tool further comprises a tool diameter adjuster configured to adjust a tool diameter that is a diameter of an envelope circle connecting outer peripheries of the plurality of first rollers and the plurality of second rollers by axially moving the frame.

2. The inner surface finishing tool according to claim 1, wherein the second rollers have a smaller diameter than the first rollers.

3. The inner surface finishing tool according to claim 1, wherein
an outer peripheral surface of each of the second rollers is configured to strike the inner peripheral surface of the workpiece.

4. The inner surface finishing tool according to claim 1, wherein
each of the second rollers
has a cylindrical shape in which a length in the axial direction is greater than a diameter, and
is tapered such that the diameter gradually decreases toward a rear end of the mandrel, with the greatest diameter disposed at an end of each of the second rollers opposite to the rear end of the mandrel.

* * * * *